US011480166B2

United States Patent
Hayama et al.

(10) Patent No.: US 11,480,166 B2
(45) Date of Patent: Oct. 25, 2022

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Takahiro Ejima, Tokyo (JP); Daichi Kurihara, Tokyo (JP); Wataru Takahashi, Tokyo (JP); Keigo Shirafuji, Tokyo (JP); Yoshihiro Ogawa, Tokyo (JP)

(73) Assignee: EAGLE INDUSTRY CO., LTD.

( * ) Notice: Subject to any disclaimer, the term of this patent is extended or adjusted under 35 U.S.C. 154(b) by 33 days.

(21) Appl. No.: 17/256,953

(22) PCT Filed: Jul. 9, 2019

(86) PCT No.: PCT/JP2019/027112
§ 371 (c)(1),
(2) Date: Dec. 29, 2020

(87) PCT Pub. No.: WO2020/013169
PCT Pub. Date: Jan. 16, 2020

(65) Prior Publication Data
US 2021/0123422 A1  Apr. 29, 2021

(30) Foreign Application Priority Data
Jul. 13, 2018  (JP) .............................. JP2018-133236

(51) Int. Cl.
*F04B 27/18* (2006.01)
*F16K 31/06* (2006.01)
(Continued)

(52) U.S. Cl.
CPC .......... *F04B 27/1804* (2013.01); *F04B 27/10* (2013.01); *F16K 31/0603* (2013.01);
(Continued)

(58) Field of Classification Search
CPC .................. F04B 27/10; F04B 27/1804; F04B 2027/1813; F04B 2027/1818;
(Continued)

(56) References Cited

U.S. PATENT DOCUMENTS

| 6,010,312 A | 1/2000 | Suitou et al. ............. F04B 1/26 |
| 6,354,811 B1 | 3/2002 | Ota et al. .................... 417/222.2 |

(Continued)

FOREIGN PATENT DOCUMENTS

| EP | 1081378 | 3/2001 | ............. F04B 27/18 |
| EP | 2594794 | 5/2013 | ............. F04B 27/18 |

(Continued)

OTHER PUBLICATIONS

International Search Report and Written Opinion issued in PCT/JP2019/043374, dated Jan. 7, 2020, with English translation, 10 pages.

(Continued)

*Primary Examiner* — Devon C Kramer
*Assistant Examiner* — Joseph S. Herrmann
(74) *Attorney, Agent, or Firm* — Hayes Soloway P.C.

(57) ABSTRACT

A capacity control valve includes a valve housing provided with a discharge port, suction ports, a control port and a primary valve driven by a solenoid. The capacity control valve further includes a differential CS valve which includes a differential CS valve body disposed so as to be relatively movable in an axial direction with respect to the primary valve bodies. The differential CS valve body divides a control pressure chamber into a discharge side control chamber communicating with the first control port and a suction side control chamber communicating with the second control port in the axial direction and operates the differential CS valve body by a differential pressure between the discharge side control chamber and the suction side (Continued)

control chamber so as to open the second control port and the suction port.

14 Claims, 6 Drawing Sheets

(51) Int. Cl.
   *F04B 27/10* (2006.01)
   *F04B 49/22* (2006.01)

(52) U.S. Cl.
   CPC .......... *F16K 31/0606* (2013.01); *F04B 49/22* (2013.01); *F04B 2027/185* (2013.01); *F04B 2027/1813* (2013.01); *F04B 2027/1827* (2013.01); *F04B 2027/1831* (2013.01); *F04B 2027/1845* (2013.01); *F04B 2027/1859* (2013.01)

(58) Field of Classification Search
   CPC ...... F04B 2027/1827; F04B 2027/1831; F04B 2027/1845; F04B 2027/185; F04B 2027/1859; F16K 31/0603; F16K 31/0606
   See application file for complete search history.

(56) References Cited

U.S. PATENT DOCUMENTS

| | | | |
|---|---|---|---|
| 6,358,017 B1 | 3/2002 | Ota et al. | 417/222.2 |
| 6,361,283 B1 | 3/2002 | Ota et al. | 417/222.2 |
| 6,485,267 B1 | 11/2002 | Imai et al. | F04B 1/26 |
| 8,021,124 B2 | 9/2011 | Umemura et al. | 417/222.2 |
| 8,079,827 B2 | 12/2011 | Iwa et al. | 417/222.2 |
| 9,732,874 B2 | 8/2017 | Saeki | F04B 27/1804 |
| 9,777,863 B2 | 10/2017 | Higashidozono | F04B 27/1804 |
| 11,053,933 B2 | 7/2021 | Warren | F04B 27/1804 |
| 11,085,431 B2 | 8/2021 | Fukudome | F04B 27/18 |
| 11,156,301 B2 | 11/2021 | Hayama | F16K 31/0627 |
| 2004/0060604 A1 | 4/2004 | Uemura et al. | 137/595 |
| 2005/0035321 A1 | 2/2005 | Uemura | F16K 27/041 |
| 2005/0287014 A1* | 12/2005 | Umemura | F04B 27/1804 417/222.1 |
| 2006/0218953 A1 | 10/2006 | Hirota | 62/228.5 |
| 2007/0214814 A1 | 9/2007 | Umemura et al. | 62/228.1 |
| 2008/0138213 A1 | 6/2008 | Umemura | F04B 27/1804 |
| 2009/0108221 A1 | 4/2009 | Umemura | F04B 27/1804 |
| 2009/0183786 A1 | 7/2009 | Iwa et al. | 137/487.2 |
| 2012/0198992 A1 | 8/2012 | Futakuchi et al. | 91/505 |
| 2012/0198993 A1 | 8/2012 | Fukudome et al. | F04B 27/18 |
| 2013/0126017 A1 | 5/2013 | Ota et al. | F04B 27/1804 |
| 2014/0130916 A1 | 5/2014 | Saeki | F04B 27/1804 |
| 2015/0004010 A1 | 1/2015 | Saeki | F04B 27/1804 |
| 2015/0068628 A1 | 3/2015 | Iwa et al. | F16K 31/06 |
| 2015/0211506 A1* | 7/2015 | Shirafuji | F04B 27/1804 417/269 |
| 2015/0345655 A1 | 12/2015 | Higashidozono et al. | F16K 31/0624 |
| 2016/0290326 A1 | 10/2016 | Sugamura | F04B 27/1804 |
| 2017/0175726 A1 | 6/2017 | Kume | F04B 27/1804 |
| 2017/0028462 A1 | 10/2017 | Hayama et al. | F16K 47/06 |
| 2017/0284562 A1 | 10/2017 | Hayama et al. | F16K 47/06 |
| 2017/0356430 A1 | 12/2017 | Irie et al. | F04B 27/1804 |
| 2018/0291888 A1 | 10/2018 | Tonegawa | F16K 31/0624 |
| 2020/0362974 A1 | 11/2020 | Hayama | F04B 49/22 |
| 2021/0285433 A1 | 9/2021 | Hayama | F04B 27/1804 |
| 2022/0034414 A1 | 2/2022 | Ito | F04B 27/18 |

FOREIGN PATENT DOCUMENTS

| | | | |
|---|---|---|---|
| EP | 2 784 320 | 10/2014 | F04B 27/18 |
| EP | 3 431 760 | 1/2019 | F04B 27/18 |
| JP | 5-306679 | 11/1993 | F04B 27/08 |
| JP | 6-200875 | 7/1994 | F04B 27/08 |
| JP | 7-27049 | 1/1995 | F04B 27/10 |
| JP | 9-144929 | 6/1997 | F16K 31/06 |
| JP | 2000-345961 | 12/2000 | F04B 27/14 |
| JP | 2001-73939 | 3/2001 | F04B 27/14 |
| JP | 2001-132632 | 5/2001 | F04B 27/14 |
| JP | 2003-42062 | 2/2003 | F04B 27/14 |
| JP | 2006-52648 | 2/2006 | F04B 27/14 |
| JP | 2006-307828 | 11/2006 | F04B 27/14 |
| JP | 2007-247512 | 9/2007 | F04B 27/14 |
| JP | 2008-14269 | 1/2008 | F04B 27/14 |
| JP | 2008-202572 | 9/2008 | F04B 27/14 |
| JP | 4242624 | 1/2009 | F04B 49/00 |
| JP | 2011-32916 | 2/2011 | F04B 27/14 |
| JP | 4700048 | 3/2011 | F04B 49/00 |
| JP | 5167121 | 12/2012 | F04B 27/14 |
| JP | 2014-118939 | 6/2014 | F04B 27/14 |
| JP | 5557901 | 6/2014 | F04B 27/14 |
| JP | 2014-190247 | 10/2014 | F04B 27/14 |
| JP | 2016-196876 | 11/2016 | F04B 27/18 |
| JP | 2017-129042 | 7/2017 | F04B 27/18 |
| JP | 6206274 | 10/2017 | F04B 27/18 |
| JP | 2017-223348 | 12/2017 | F16K 11/10 |
| JP | 2018-21646 | 2/2018 | F16K 31/06 |
| JP | 2018-40385 | 3/2018 | F16K 31/06 |
| JP | 2018-145877 | 9/2018 | F04B 39/14 |
| JP | 2019-2384 | 1/2019 | F04B 27/18 |
| WO | WO 2007/119380 | 10/2007 | F04B 27/14 |
| WO | WO2011021789 | 2/2011 | F04B 27/14 |
| WO | WO2011135911 | 11/2011 | F04B 27/14 |
| WO | WO2013109005 | 7/2013 | F04B 49/06 |
| WO | WO2013176012 | 11/2013 | F04B 27/14 |
| WO | WO 2014/091975 | 6/2014 | F04B 27/14 |
| WO | WO 2014/119594 | 8/2014 | F04B 27/14 |
| WO | WO2016104390 | 6/2016 | F16K 31/06 |
| WO | WO 2017/057160 | 4/2017 | F04B 27/18 |
| WO | WO 2017/159553 | 9/2017 | F04B 27/18 |
| WO | WO2018207461 | 11/2018 | F04B 27/18 |
| WO | WO2019167912 | 9/2019 | F04B 27/18 |

OTHER PUBLICATIONS

International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
U.S. Official Action issued in related U.S. Appl. No. 17/259,138, dated Jan. 18, 2022, 14 pages.
Notice of Allowance issued in related U.S. Appl. No. 17/287,086, dated Feb. 2, 2022, 7 pages.
U.S. Appl. No. 17/259,138, filed Jan. 8, 2021, Hayama et al.
U.S. Appl. No. 17/258,708, filed Jan. 7, 2021, Hayama et al.
U.S. Appl. No. 17/258,692, filed Jan. 7, 2021, Hayama et al.
U.S. Appl. No. 17/256,947, filed Dec. 29, 2020, Hayama et al.

(56) References Cited

OTHER PUBLICATIONS

U.S. Appl. No. 17/256,955, filed Dec. 29, 2020, Hayama et al.
U.S. Appl. No. 17/256,959, filed Dec. 29, 2020, Hayama et al.
U.S. Appl. No. 17/056,988, filed Nov. 19, 2020, Kurihara et al.
U.S. Appl. No. 16/969,175, filed Aug. 11, 2020, Kurihara et al.
U.S. Appl. No. 16/967,693, filed Aug. 5, 2020, Hayama et al.
U.S. Appl. No. 16/967,692, filed Aug. 5, 2020, Hayama et al.
U.S. Appl. No. 16/962,786, filed Jul. 16, 2020, Hayama et al.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
Chinese Official Action issued in related application serial No. 201980044409.4, dated Jan. 26, 2022, with translation, 10 pages.
European Search Report issued in related application serial No. 19848099.8, dated Feb. 9, 2022, 7 pages.
European Search Report issued in related application serial No. 19847690.5, dated Feb. 9, 2022, 5 pages.
European Search Report issued in related application serial No. 19834556.3, dated Feb. 17, 2022, 7 pages.
Chinese Official Action issued in related application serial No. 201980044138.2, dated Mar. 30, 2022, with translation, 9 pages.
Chinese Official Action issued in related application serial No. 201980044077.x, dated Apr. 2, 2022, with translation, 11 pages.
Chinese Official Action issued in related application serial No. 201980046798.4, dated Apr. 6, 2022, with translation, 8 pages.
Chinese Official Action issued in related application serial No. 201980046750.3, dated Apr. 27, 2022, with translation, 11 pages.
Chinese Official Action issued in related application serial No. 201980047614.6, dated Apr. 26, 2022, with translation, 9 pages.
European Search Report issued in related application serial No. 19834984.7, dated Feb. 21, 2022, 12 pages.
European Search Report issued in related application serial No. 19894059.5, dated Jun. 7, 2022, 4 pages.
European Search Report issued in related application serial No. 19833331.2, dated Mar. 30, 2022, 6 pages.
European Search Report issued in related application serial No. 19847395.1, dated Feb. 9, 2022, 5 pages.
European Search Report issued in related application serial No. 19833028.4, dated Apr. 7, 2022, 8 pages.
European Search Report issued in related application serial No. 19883193.5, dated May 23, 2022, 5 pages.
U.S. Official Action issued in related U.S. Appl. No. 17/299,285, dated Mar. 31, 2022, 11 pages.
U.S. Official Action issued in related U.S. Appl. No. 17/256,953, dated Apr. 15, 2022, 18 pages.
U.S. Official Action issued in related U.S. Appl. No. 17/259,138, dated Mar. 31, 2022, 5 pages.
U.S. Official Action issued in related U.S. Appl. No. 17/256,955, dated Feb. 18, 2022, 19 pages.
U.S. Official Action issued in related U.S. Appl. No. 17/259,138, dated Jan. 19, 2022, 6 pages.
U.S. Official Action issued in related U.S. Appl. No. 17/256,959, dated May 5, 2022, 18 pages.
U.S. Official Action issued in related U.S. Appl. No. 17/433,558, dated May 25, 2022, 11 pages.

* cited by examiner

CAPACITY CONTROL VALVE

TECHNICAL FIELD

The present invention relates to a capacity control valve for variably controlling a capacity of a working fluid and relates to, for example, a capacity control valve for controlling a discharge amount of a variable displacement compressor used in an air conditioning system of an automobile in response to a pressure.

BACKGROUND ART

A variable displacement compressor used in an air conditioning system of an automobile or the like includes a rotating shaft rotationally driven by an engine, a swash plate connected to the rotating shaft so that an inclination angle is variable, a compression piston connected to the swash plate, and the like and changes the inclination angle of the swash plate so that a stroke amount of the piston is changed to control a discharge amount of a fluid. The inclination angle of the swash plate can be changed continuously by appropriately controlling a pressure inside a control chamber, by using a capacity control valve driven to be opened and closed by an electromagnetic force, while using a suction pressure Ps of a suction chamber sucking a fluid, a discharge pressure Pd of a discharge chamber discharging a fluid pressurized by the piston, and a control pressure Pc of the control chamber accommodating the swash plate.

When the variable displacement compressor is driven continuously (hereinafter, simply referred to as a "continuous driving state"), the capacity control valve is energized and controlled by a control computer and performs normal control in which a valve body is moved in the axial direction by an electromagnetic force generated in a solenoid and a primary valve is opened and closed so as to adjust a control pressure Pc of the control chamber of the variable displacement compressor.

During normal control of the capacity control valve, the pressure of the control chamber of the variable displacement compressor is appropriately controlled and the inclination angle of the swash plate with respect to the rotating shaft is continuously changed to change the stroke amount of the piston so that the discharge amount of the fluid with respect to the discharge chamber is controlled and the air conditioning system is adjusted to have desired cooling capacity. Further, when the variable displacement compressor is driven with a maximum capacity, the primary valve of the capacity control valve is closed so as to decrease the pressure of the control chamber. Accordingly, the inclination angle of the swash plate becomes maximal.

Further, a hollow rod is formed by a primary valve body and a member connected to the primary valve body, a through-hole is formed in the hollow rod in the radial direction, and an auxiliary communication path communicating a control port and a suction port of the capacity control valve with each other is formed by the through-hole and a communication path inside the hollow rod. There is known a method of improving responsiveness of the variable displacement compressor by discharging a refrigerant of the control chamber of the variable displacement compressor to the suction chamber of the variable displacement compressor through the control port, the auxiliary communication path, and the suction port at startup and promptly decreasing the pressure of the control chamber at startup (see Patent Citation 1).

CITATION LIST

Patent Literature

Patent Citation 1: JP 5167121 B2 (Page 7, FIG. 2)

SUMMARY OF INVENTION

Technical Problem

However, in Patent Citation 1, a fluid discharge function is excellent at startup, but when the energizing of the capacity control valve is controlled in the continuous driving state of the variable displacement compressor, the auxiliary communication path with the through-hole having a certain opening area is in a communication state so that a refrigerant flows from the control port into the suction port. As a result, there is concern that the controllability of the pressure of the control chamber is poor and the operation efficiency of the variable displacement compressor is deteriorated.

The present invention has been made in view of such problems and an object of the present invention is to provide a capacity control valve having good operation efficiency while having a fluid discharge function at startup.

Solution to Problem

In order to solve the foregoing problems, a capacity control valve according to the present invention includes: a valve housing provided with a discharge port allowing a discharge fluid of a discharge pressure to pass therethrough, a suction port allowing a suction fluid of a suction pressure to pass therethrough, and a control port allowing a control fluid of a control pressure to pass therethrough, and a primary valve which includes a primary valve seat and a primary valve body driven by a solenoid and controls a flow of a fluid between the discharge port and the control port by a movement of the primary valve body. The control port includes a first control port and a second control port. The capacity control valve further includes a differential CS valve which includes a differential CS valve body disposed so as to be relatively movable in an axial direction with respect to the primary valve body and dividing a control pressure chamber into a discharge side control chamber and a suction side control chamber in the axial direction, the control pressure chamber communicating with the control port, the discharge side control chamber communicating with the first control port, the suction side control chamber communicating with the second control port. The differential CS valve body is operated by a differential pressure between the discharge side control chamber and the suction side control chamber so as to open the second control port and the suction port. According to the aforesaid feature, at the time of starting the variable displacement compressor, the primary valve body moves so as to close the primary valve and the differential CS valve body moves together with the primary valve body so as to close the first control port and to open the second control port without allowing the discharge fluid to flow into the discharge side control chamber. Accordingly, when the control fluid flows from the second control port to the suction side control chamber so that the pressure of the suction side control chamber increases and the pressure of the fluid of the discharge side control chamber becomes smaller than the pressure of the fluid of the suction side control chamber, the differential CS valve body moves to the discharge side control chamber and opens the differential CS valve so that the second control port communicates with the suction port. As a result, it is possible to improve the responsiveness at startup by discharging a liquefied fluid from the control chamber into the suction chamber through the differential CS valve in a short time. Further, since the differential CS valve is closed when a drive force generated by the solenoid is a predetermined value or less and the differential CS valve is opened when the drive force is the predetermined value or more in the energized state of the capacity control valve, the operation efficiency of the capacity control valve is high.

It may be preferable that at least one of an outer periphery of the primary valve body and an inner periphery of the differential CS valve body is provided with a groove communicating the discharge side control chamber with the suction port. According to this configuration, since the discharge side control chamber always communicates with the suction port by the groove, a fluid of the discharge side control chamber can be discharged regardless of the movement of the primary valve body or the differential CS valve body.

It may be preferable that a spring configured to urge the differential CS valve body in a closing direction is disposed between the differential CS valve body and the primary valve body. According to this configuration, the differential CS valve can be reliably closed when there is no need to communicate the second control port with the suction port.

It may be preferable that the primary valve body is provided with a movement regulation portion which regulates a movement of the differential CS valve body in a closing direction. According to this configuration, the differential CS valve can have a simple configuration.

It may be preferable that when the solenoid is in a non-energized state, the differential CS valve body is regulated by the movement regulation portion and the differential CS valve body closes a communication between the second control port and the suction side control chamber. According to this configuration, since the suction side control chamber is a closed space when the solenoid is in the non-energized state, a fluid does not easily flow from the second control port to the suction port.

It may be preferable that the differential CS valve has a spool valve structure. According to this configuration, the differential CS valve can be reliably closed.

It may be preferable that the capacity control valve further includes a pressure drive valve which is opened and closed by the suction pressure, and the primary valve body constitutes a part of a hollow rod provided with a hollow communication path capable of causing a pressure-sensitive chamber to communicate with the suction port by opening and closing the pressure drive valve. According to this configuration, since a force applied from the pressure drive valve to the primary valve body changes in response to the suction pressure during control, the valve opening degree of the primary valve is slightly changed in response to the suction pressure. Further, since a refrigerant can be also discharged by the pressure drive valve at startup, the refrigerant can be discharged promptly.

DESCRIPTION OF EMBODIMENTS

Modes for implementing a capacity control valve according to the present invention will be described on the basis of embodiments.

Embodiments

A capacity control valve according to an embodiment will be described with reference to FIGS. 1 to 5. Hereinafter, the left and right sides as viewed from the front side in FIG. 2 will be described as the left and right sides of the capacity control valve.

A capacity control valve V of the present invention is incorporated in a variable displacement compressor M used in an air conditioning system of an automobile or the like and variably controls a pressure of a working fluid (hereinafter, simply referred to as a "fluid") which is a refrigerant so that a discharge amount of the variable displacement compressor M is controlled to adjust the air conditioning system to a desired cooling capacity.

Figure 1:
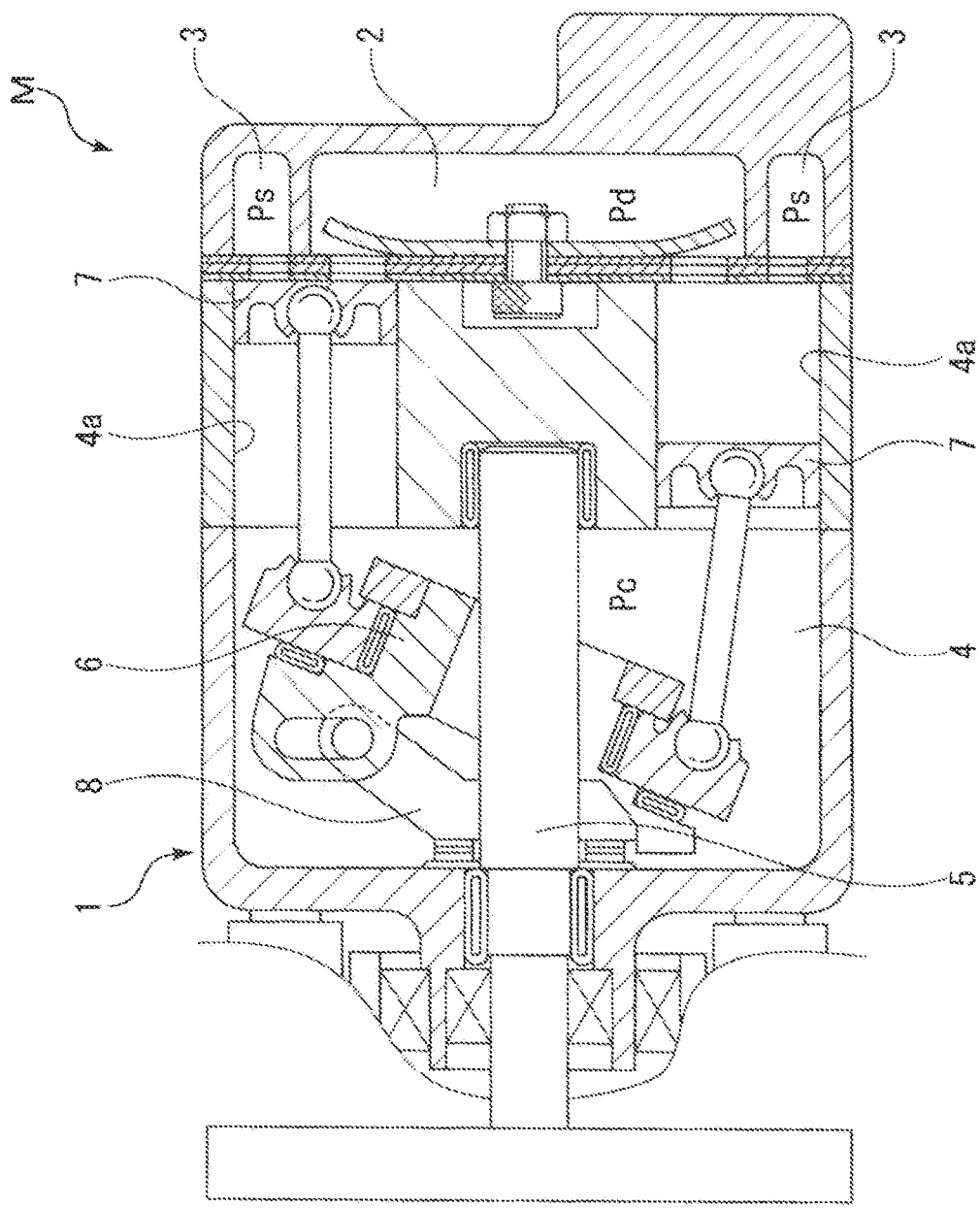
FIG. 1 is a schematic configuration diagram illustrating a swash plate type variable displacement compressor incorporated with a capacity control valve of an embodiment according to the present invention.

First, the variable displacement compressor M will be described. As illustrated in FIG. 1, the variable displacement compressor M includes a casing 1 having a discharge chamber 2, a suction chamber 3, a control chamber 4, and a plurality of cylinders 4a. In addition, the variable displacement compressor M is provided with a communication path (not illustrated) allowing the control chamber 4 and the suction chamber 3 to directly communicate with each other and this communication path is provided with a fixed orifice for adjusting a pressure between the suction chamber 3 and the control chamber 4 in a balanced state.

Further, the variable displacement compressor M includes a rotating shaft 5 which is rotationally driven by an engine (not illustrated) installed outside the casing 1, a swash plate 6 which is eccentrically connected to the rotating shaft 5 inside the control chamber 4 by a hinge mechanism 8, and a plurality of pistons 7 which are connected to the swash plate 6 and are fitted so as to be movable in a reciprocating manner inside the respective cylinders 4a and continuously changes an inclination angle of the swash plate 6 by appropriately controlling a pressure inside the control chamber 4, by using the capacity control valve V driven to be opened and closed by an electromagnetic force, while using a suction pressure Ps of the suction chamber 3 sucking a fluid, a discharge pressure Pd of the discharge chamber 2 discharging a fluid pressurized by the piston 7, and a control pressure Pc of the control chamber 4 accommodating the swash plate 6 so that a stroke amount of the piston 7 is changed to control a discharge amount of the fluid. Further, for convenience of description, the capacity control valve V incorporated in the variable displacement compressor M is omitted in FIG. 1.

Specifically, the inclination angle of the swash plate 6 with respect to the rotating shaft 5 becomes smaller so that the stroke amount of the piston 7 decreases as the control pressure Pc inside the control chamber 4 becomes higher. However, when the pressure becomes a certain level or more, the swash plate 6 is substantially perpendicular to the rotating shaft 5, that is, slightly inclined from the vertical state. At this time, since the stroke amount of the piston 7 is minimized and the pressurization of the fluid inside the cylinder 4a by the piston 7 is minimized, the discharge amount of the fluid to the discharge chamber 2 decreases and the cooling capacity of the air conditioning system is minimized. On the other hand, the inclination angle of the swash plate 6 with respect to the rotating shaft 5 becomes larger so that the stroke amount of the piston 7 increases as the control pressure Pc inside the control chamber 4 becomes lower. However, when the pressure becomes a certain level or less, the inclination angle of the swash plate 6 with respect to the rotating shaft 5 is maximized. At this time, since the stroke amount of the piston 7 is maximized and the pressurization of the fluid inside the cylinder 4a by the piston 7 is maximized, the discharge amount of the fluid to the discharge chamber 2 increases and the cooling capacity of the air conditioning system is maximized.

Figure 2:
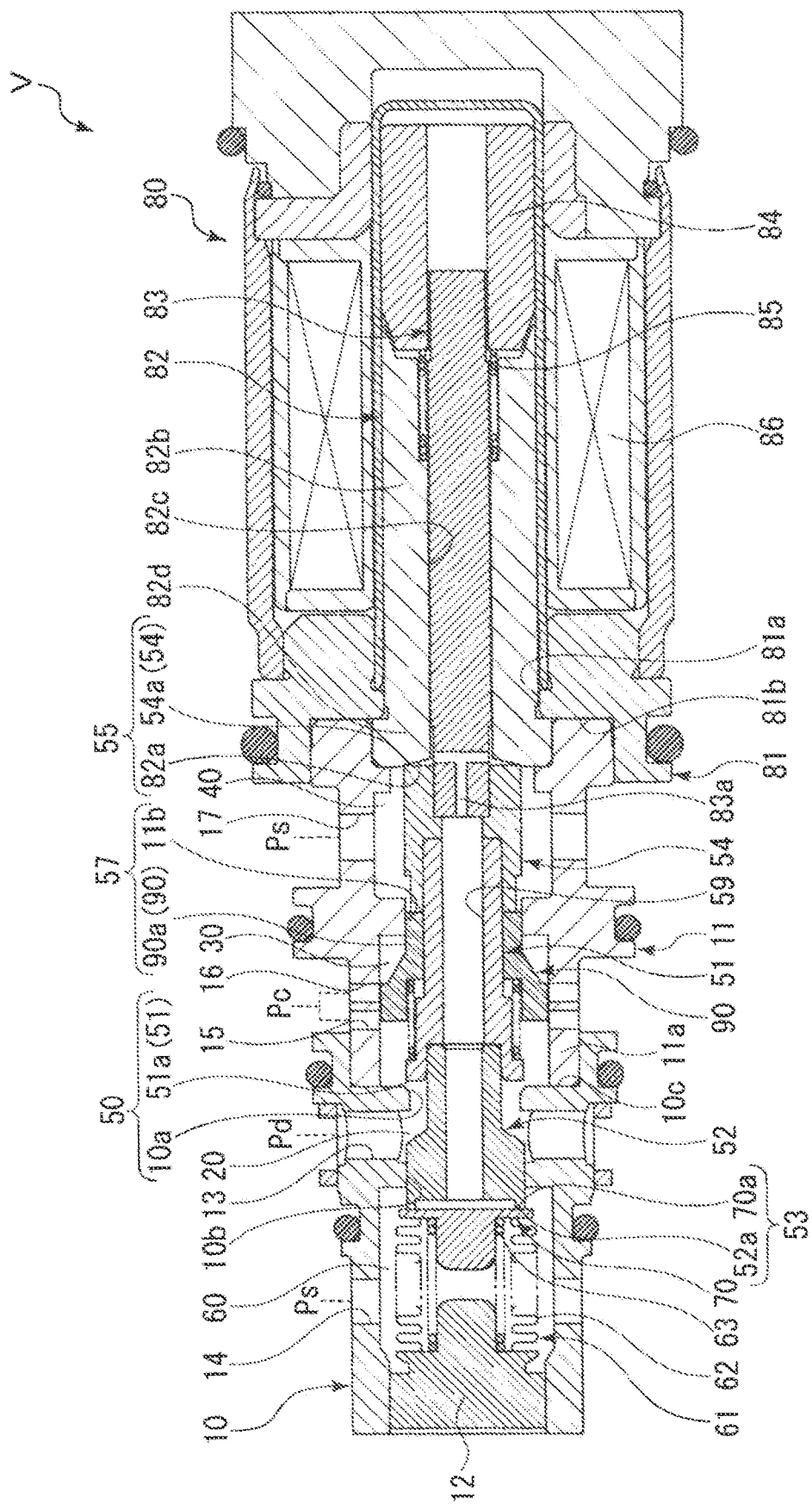
FIG. 2 is a cross-sectional view illustrating a case in which a primary valve is opened, a differential CS valve body opens a first Pc port and closes a second Pc port, and a differential CS valve is closed in a non-energized state of the capacity control valve of the embodiment.

As illustrated in FIG. 2, the capacity control valve V incorporated in the variable displacement compressor M adjusts a current flowing through a coil 86 constituting a solenoid 80 so as to perform the opening and closing control of a primary valve 50 and a sub-valve 55 of the capacity control valve V. Further, a pressure-sensitive body 61 is operated by the suction pressure Ps of an intermediate communication path 59 corresponding to a hollow communication path so as to perform the opening and closing control of the pressure-sensitive valve 53 corresponding to a pressure drive valve.

In the embodiment, the primary valve 50 includes a primary valve body and a primary valve seat 10a formed on inner peripheral surfaces of a first hollow rod 51 corresponding to a hollow rod and a first valve housing 10 corresponding to a valve housing and the primary valve 50 is opened and closed when a left axial end 51a of the first hollow rod 51 is brought into contact with and separated from the primary valve seat 10a. The pressure-sensitive valve 53 includes a cap 70 constituting a part of the pressure-sensitive body 61 and a pressure-sensitive valve seat 52a formed in a left axial end of a pressure-sensitive valve member 52 corresponding to a hollow rod and the pressure-sensitive valve 53 is opened and closed when a seal surface 70a formed on an outer radial side of a right axial end of the cap 70 is brought into contact with and separated from the pressure-sensitive valve seat 52a. The sub-valve 55 includes a primary valve body and a sub-valve seat 82a formed on opening end surfaces, that is, left axial end surfaces of a second hollow rod 54 corresponding to a hollow rod and a fixed iron core 82 and the sub-valve 55 is opened and closed when a right axial end 54a of the second hollow rod 54 is brought into contact with and separated from the sub-valve seat 82a.

Next, the structure of the capacity control valve V will be described. As illustrated in FIG. 2, the capacity control valve V mainly includes the first valve housing 10 and a second valve housing 11 which are formed of a metal material or a resin material and correspond to a valve housing, the first hollow rod 51, the pressure-sensitive valve member 52, the second hollow rod 54, and a differential CS valve body 90 which are disposed in the first valve housing 10 and the second valve housing 11 so as to be movable in a reciprocating manner in the axial direction, the pressure-sensitive body 61 which applies an urging force to the first hollow rod 51, the pressure-sensitive valve member 52, and the second hollow rod 54 rightward in the axial direction in response to the suction pressure Ps of the intermediate communication path 59, and the solenoid 80 which is connected to the second valve housing 11 and applies a drive force to the first hollow rod 51, the pressure-sensitive valve member 52, and the second hollow rod 54 and the differential CS valve body 90 is externally fitted to the first hollow rod 51 and is provided so as to be movable in a reciprocating manner in the axial direction relative to the first hollow rod 51, the pressure-sensitive valve member 52, and the second hollow rod 54.

As illustrated in FIG. 2, the solenoid 80 mainly includes a casing 81 which includes an opening portion 81a opening to the left side in the axial direction, a substantially cylindrical fixed iron core 82 which is inserted into the opening portion 81a of the casing 81 from the left side in the axial direction and is fixed to the inner radial side of the casing 81, a drive rod 83 which is disposed on the inner radial side of the fixed iron core 82 so as to be movable in a reciprocating manner in the axial direction so that the left axial end portion is connected and fixed to the second hollow rod 54, a movable iron core 84 which is fixed to the right axial end portion of the drive rod 83, a coil spring 85 which is provided between the fixed iron core 82 and the movable iron core 84 and urges the movable iron core 84 rightward in the axial direction, and an excitation coil 86 which is wound on the outside of the fixed iron core 82 with a bobbin interposed therebetween.

The casing 81 is provided with a concave portion 81b of which an inner radial side of a left axial end is recessed rightward in the axial direction and a right axial end portion of the second valve housing 11 is inserted and fixed to the concave portion 81b in a substantially sealed state.

The fixed iron core 82 is formed of a rigid body corresponding to a magnetic material such as iron or silicon steel and includes a cylindrical portion 82b which is provided with an insertion hole 82c extending in the axial direction so that the drive rod 83 is inserted therethrough and an annular flange portion 82d which extends outward in the radial direction from the outer peripheral surface of the left axial end portion of the cylindrical portion 82b and a sub-valve seat 82a is formed on a left axial end surface of the cylindrical portion 82b.

As illustrated in FIG. 2, the first valve housing 10 is provided with a concave portion 10c which is recessed from the radial center of the right axial end leftward in the axial direction and an insertion portion 11a formed in a left axial end portion of the second valve housing 11 is inserted and fitted thereto from the right side in the axial direction so as to be integrally connected and fixed thereto in a sealed state. Further, the first valve housing 10 is provided with a Pd port 13 which corresponds to a discharge port communicating with the discharge chamber 2 of the variable displacement compressor M and a first Ps port 14 which corresponds to a suction port communicating with the suction chamber 3 of the variable displacement compressor M. Further, the second valve housing 11 is provided with a first Pc port 15 which corresponds to a first control port and a control port located on the left side in the axial direction and communicating with the control chamber 4 of the variable displacement compressor M, a second Pc port 16 which corresponds to a second control port and a control port located on the right side in the axial direction, and a second Ps port 17 which corresponds to a suction port communicating with the suction chamber 3 of the variable displacement compressor M. That is, the first valve housing 10 and the second valve housing 11 are provided with the ports such that the second Ps port 17, the second Pc port 16, the first Pc port 15, the Pd port 13, and the first Ps port 14 are sequentially formed from the solenoid 80.

Further, a partition adjustment member 12 is press-inserted into a left axial end portion of the first valve housing 10 in a substantially sealed state so that the first valve housing has a substantially bottomed cylindrical shape. In addition, the partition adjustment member 12 can adjust the urging force of the pressure-sensitive body 61 by adjusting the installation position of the first valve housing 10 in the axial direction.

The first hollow rod 51, the pressure-sensitive valve member 52, the second hollow rod 54, and the differential CS valve body 90 are disposed inside the first valve housing 10 and the second valve housing 11 so as to be movable in a reciprocating manner in the axial direction and a part of the inner peripheral surface of the first valve housing 10 is provided with a small-diameter guide surface 10b on which the outer peripheral surface of the pressure-sensitive valve member 52 is slidable in a substantially sealed state.

Further, a first valve chamber 20 which communicates with the Pd port 13 and in which the pressure-sensitive valve member 52 is disposed and a pressure-sensitive chamber 60 which communicates with the first Ps port 14 and in which the pressure-sensitive body 61 is disposed are formed in the first valve housing 10. Further, a second valve chamber 30 (also referred to as a control pressure chamber) which communicates with the first Pc port 15 and the second Pc port 16 and in which the left axial end 51a of the first hollow rod 51 and the differential CS valve body 90 are disposed and a third valve chamber 40 which communicates with the second Ps port 17 and in which the second hollow rod 54 is disposed are formed in the second valve housing 11. Additionally, the second valve chamber 30 is defined by the outer peripheral surfaces of the first hollow rod 51 and the differential CS valve body 90, the inner radial portion of the concave portion 10c of the first valve housing 10, and the inner peripheral surface on the left side in the axial direction in relation to a differential CS valve seat 11b formed on an inner peripheral surface of an annular protrusion extending toward the inner radial side of the second valve housing 11. Specifically, the second valve chamber 30 is divided into a space 30A (a discharge side control chamber) and a space 30B (a suction side control chamber) by the differential CS valve body 90 in the axial direction. The first Pc port 15 can communicate the space 30A defined on the left side in the axial direction with a second cylindrical portion 90c of the differential CS valve body 90 to be described later interposed therebetween in the second valve chamber 30 with the control chamber 4 of the variable displacement compressor M and the second Pc port 16 can communicate the space 30B defined on the right sides in the axial direction with the control chamber 4 of the variable displacement compressor M (see FIGS. 3 to 5). Further, the third valve chamber 40 is defined by the outer peripheral surfaces of the second hollow rod 54 and the drive rod 83, the left axial end surface of the fixed iron core 82, and the inner peripheral surface on the right side in the axial direction in relation to the differential CS valve seat 11b of the second valve housing 11.

As illustrated in FIG. 2, the pressure-sensitive body 61 mainly includes a bellows core 62 which has a coil spring 63 embedded therein and the disk-shaped cap 70 which is provided in the right axial end of the bellows core 62 and the left axial end of the bellows core 62 is fixed to the partition adjustment member 12.

Further, the pressure-sensitive body 61 is disposed in the pressure-sensitive chamber 60 and the seal surface 70a of the cap 70 sits on the pressure-sensitive valve seat 52a of the pressure-sensitive valve member 52 by an urging force of moving the cap 70 rightward in the axial direction by the coil spring 63 and the bellows core 62. In addition, for convenience of description, although not illustrated in the drawings, the pressure-sensitive body 61 contracts by the high suction pressure Ps of the intermediate communication path 59 so that the pressure-sensitive valve 53 is opened. Accordingly, since a force applied from the pressure-sensitive body 61 to the pressure-sensitive valve member 52, for example, in a control state changes in response to the suction pressure Ps, the valve opening degree of the primary valve 50 is slightly changed in response to the suction pressure Ps and hence capacity control depending on the situation of the refrigeration cycle can be performed. Further, since the refrigerant can be also discharged by the pressure drive valve 53 through the intermediate communication path 59 and a communication hole 83a of the drive rod 83 in addition to the second Ps port 17 at the startup, the refrigerant can be promptly discharged.

Figure 3:
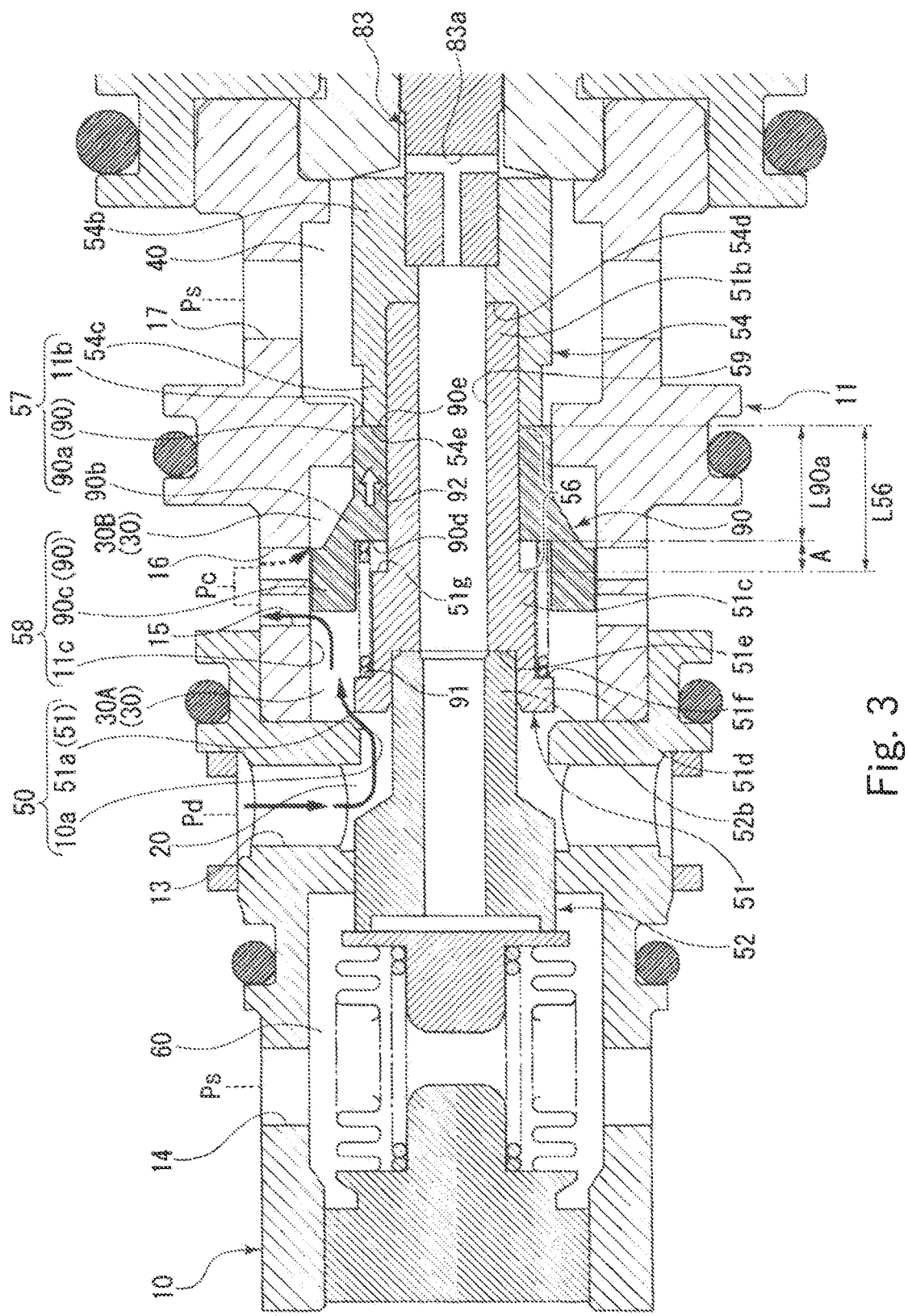
FIG. 3 is an enlarged cross-sectional view of FIG. 2 illustrating a case in which a primary valve is opened, a differential CS valve body opens a first Pc port and closes a second Pc port, and a differential CS valve is closed in a non-energized state of the capacity control valve of the embodiment.
Figure 4:
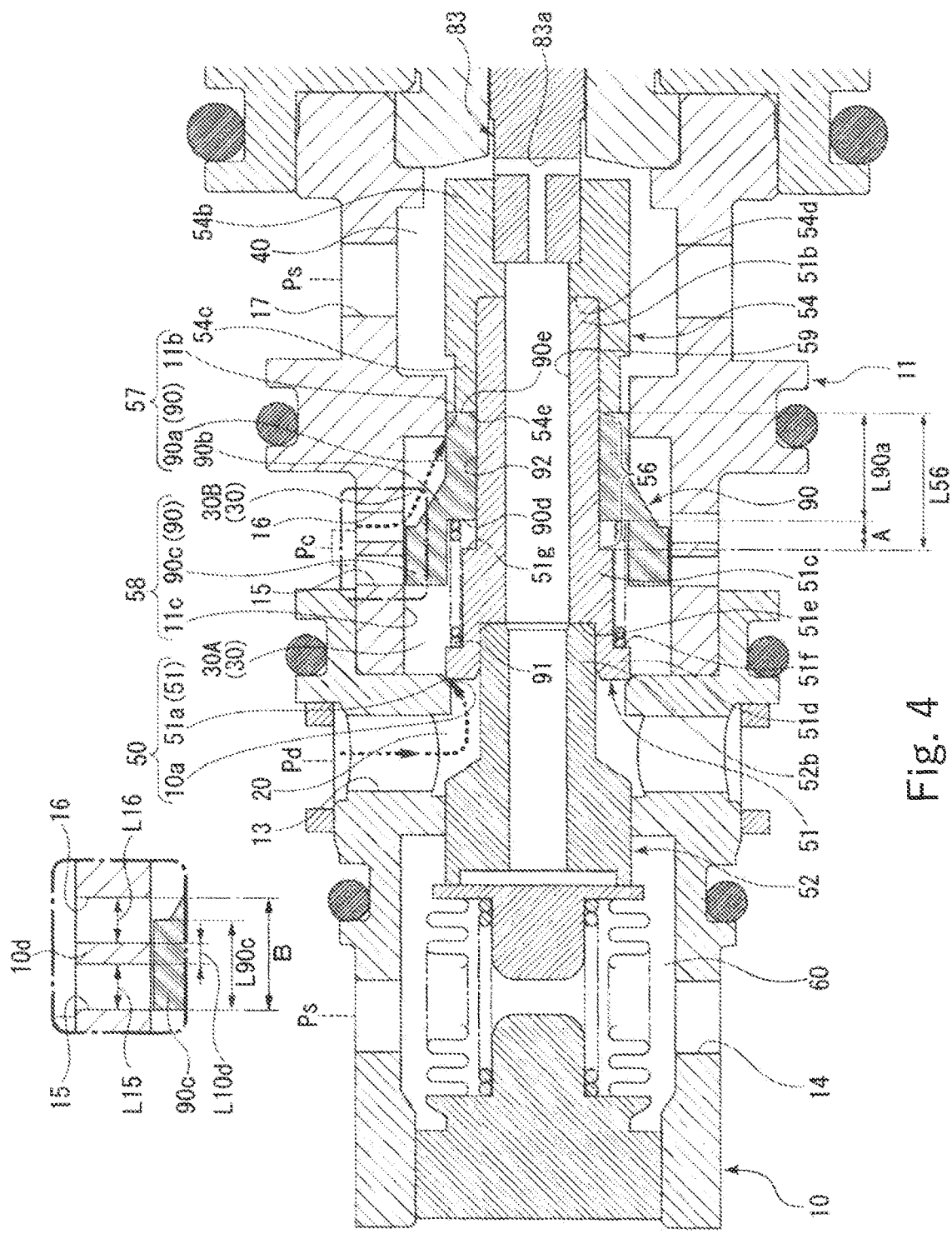
FIG. 4 is a cross-sectional view illustrating a case in which a primary valve is closed, a differential CS valve body closes a first Pc port and opens a second Pc port, and a differential CS valve is closed in an energized state (startup state) of the capacity control valve of the embodiment.
Figure 5:
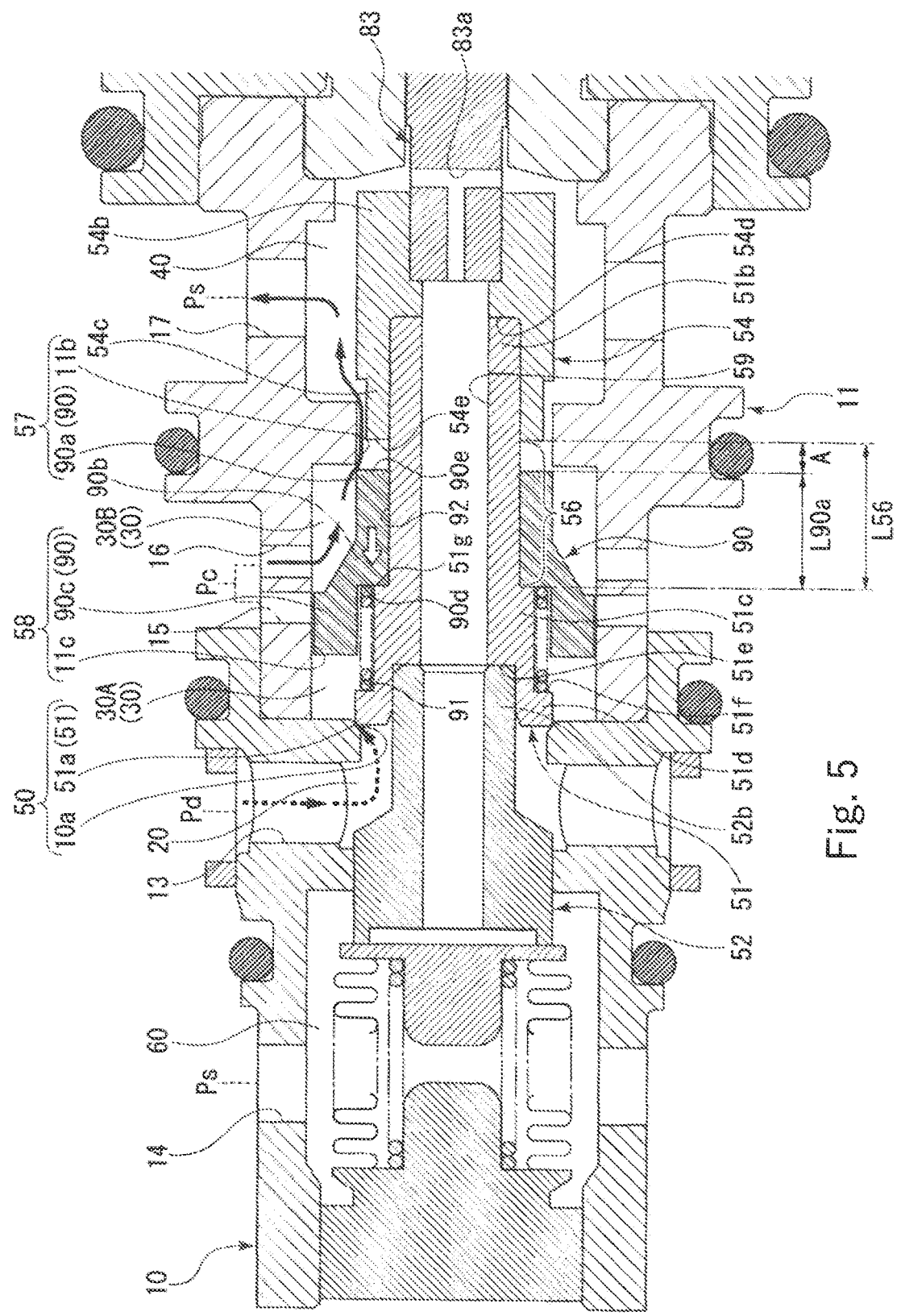
FIG. 5 is a cross-sectional view illustrating a case in which a primary valve is closed, a differential CS valve body moves so as to close a first Pc port and to open a second Pc port, and a differential CS valve is opened in an energized state of the capacity control valve of the embodiment (when a little time has elapsed from the startup of FIG. 4).

As illustrated in FIGS. 3 to 5, the first hollow rod 51 is formed in a stepped cylindrical shape and a substantially turret shape in the side view including a cylindrical portion 51b to which the left axial end portion of the second hollow rod 54 is connected and fixed, an attachment portion 51c which is formed on the left side of the cylindrical portion 51b in the axial direction so as to have a diameter larger than that of the cylindrical portion 51b and to which a coil spring 91 corresponding to a spring is externally fitted, and a contact portion 51d which is formed on the left side of the attachment portion 51c in the axial direction so as to have a diameter larger than that of the attachment portion 51c and is provided with the left axial end 51a coming into contact with and separating from the primary valve seat 10a of the first valve housing 10.

Further, the first hollow rod 51 is provided with a concave portion 51e in which the inner radial side of the left axial end of the contact portion 51d is recessed rightward in the axial direction and an insertion portion 52b formed in the right axial end portion of the pressure-sensitive valve member 52 having a substantially cylindrical shape and a substantially turret shape in the side view is inserted and fitted from the left side in the axial direction so as to be connected and fixed thereto in a integrally sealed state. Further, the first hollow rod 51 is integrally connected and fixed in a sealed state by inserting and fitting the right axial end portion of the cylindrical portion 51b to a concave portion 54d in which the inner radial side of the left axial end of the second hollow rod 54 is recessed rightward in the axial direction from the left side in the axial direction. Further, the intermediate communication path 59 which penetrates in the axial direction is formed inside the first hollow rod 51, the pressure-sensitive valve member 52, and the second hollow rod 54 by connecting the hollow holes. Additionally, the intermediate communication path 59 communicates with the third valve chamber 40 through the communication hole 83a formed in the left axial end portion of the drive rod 83 connected and fixed to the second hollow rod 54.

As illustrated in FIGS. 3 to 5, the second hollow rod 54 is formed in a stepped cylindrical shape including a first cylindrical portion 54b which is disposed in the third valve chamber 40 and to which the left axial end portion of the drive rod 83 is connected and fixed and a second cylindrical portion 54c which is formed on the left side of the first cylindrical portion 54b in the axial direction so as to have a diameter smaller than that of the first cylindrical portion 54b. Additionally, the outer peripheral surface of the second cylindrical portion 54c of the second hollow rod 54 and the differential CS valve seat 11b of the second valve housing 11 are separated from each other in the radial direction so that a flow path communicating a control fluid having passed through the second Pc port 16 and a suction fluid having passed through the second Ps port 17 with each other is formed.

Next, a differential CS valve 57 will be described. The differential CS valve 57 has a spool valve structure and includes the differential CS valve body 90 and the differential CS valve seat 11b formed on the inner peripheral surface of the second valve housing 11 and the differential CS valve 57 is opened and closed when a right axial end portion of a first cylindrical portion 90a of the differential CS valve body 90 is brought into contact with and separated from the differential CS valve seat 11b.

As illustrated in FIGS. 3 to 5, the differential CS valve body 90 is formed in a stepped cylindrical shape and a substantially turret shape in the side view including the small-diameter first cylindrical portion 90a which is disposed in the second valve chamber 30 and is externally fitted to the cylindrical portion 51b of the first hollow rod 51, a taper portion 90b which extends from the left axial end of the first cylindrical portion 90a leftward in the axial direction so as to increase in diameter, and the second cylindrical portion 90c which is formed on the left side of the taper portion 90b in the axial direction so as to have a diameter larger than that of the first cylindrical portion 90a and is externally fitted to the attachment portion 51c and the cylindrical portion 51b of the first hollow rod 51 together with the coil spring 91. Additionally, the inner peripheral surface of the first cylindrical portion 90a of the differential CS valve body 90 and the outer peripheral surface of the cylindrical portion 51b of the first hollow rod 51 are separated from each other in the radial direction so that a gap is formed therebetween and the differential CS valve body 90 is smoothly movable in the axial direction relative to the first hollow rod 51. Further, a gap 92 which is formed between the inner peripheral surface of the first cylindrical portion 90a of the differential CS valve body 90 and the outer peripheral surface of the cylindrical portion 51b of the first hollow rod 51 adjusts a pressure in a balanced state between the third valve chamber 40 and the space 30A defined on the left side of the second valve chamber 30 in the axial direction.

Further, the inside of the differential CS valve body 90 is formed in a stepped cylindrical shape in which the dimension of the inner diameter of the second cylindrical portion 90c is larger than that of the first cylindrical portion 90a and an annular surface 90d which extends outward in the radial direction from the left axial end of the inner peripheral surface of the first cylindrical portion 90a and extends continuously in a perpendicular direction is formed at an axial position corresponding to the substantial center of the taper portion 90b in the axial direction.

Further, the left axial end of the coil spring 91 is brought into contact with a side surface 51f which extends outward in the radial direction from the left axial end of the attachment portion 51c of the first hollow rod 51 and the right axial end of the coil spring 91 is brought into contact with the annular surface 90d corresponding to the inner surface of the differential CS valve body 90 externally fitted to the first hollow rod 51. That is, the differential CS valve body 90, the first hollow rod 51, the pressure-sensitive valve member 52, and the second hollow rod 54 are urged in the opposite axial directions by the coil spring 91. Additionally, the coil spring 91 is a compression spring and the outer periphery is separated from the inner peripheral surface of the second cylindrical portion 90c of the differential CS valve body 90 in the radial direction.

Further, the outer peripheral surface of the right axial end portion of the first cylindrical portion 90a of the differential CS valve body 90 is separated from the differential CS valve seat 11b formed in the second valve housing 11 in the radial direction and the outer peripheral surface of the second cylindrical portion 90c is separated from the inner peripheral surface of the second valve housing 11 in the radial direction so that a gap is formed therebetween. Accordingly, the differential CS valve body 90 is smoothly movable relative to the second valve housing 11 in the axial direction.

Further, the first cylindrical portion 90a of the differential CS valve body 90 moves in a reciprocating manner in the axial direction so as to change an overlapping amount with the differential CS valve seat 11b formed in the second valve housing 11 when viewed from the radial direction, thereby configuring the differential CS valve 57 that opens and closes the communication between the control fluid having passed through the second Pc port 16 and the suction fluid having passed through the second Ps port 17. The differential CS valve 57 is closed at a position in which the right axial end portion of the first cylindrical portion 90a of the differential CS valve body 90 overlaps the differential CS valve seat 11b when viewed from the radial direction (see FIGS. 3 and 4).

Further, the second cylindrical portion 90c of the differential CS valve body 90 moves in a reciprocating manner in the axial direction so as to change an overlapping position with the spool DC valve seat 11c formed on the inner peripheral surface on the left side of the differential CS valve seat 11b of the second valve housing 11 in the axial direction when viewed from the radial direction, thereby configuring a spool DC valve 58 that opens and closes the first Pc port 15 and the second Pc port 16. Additionally, the spool DC valve 58 is configured to open the second Pc port 16 in a state in which the first Pc port 15 is closed by the left axial end portion of the second cylindrical portion 90c of the differential CS valve body 90 (see FIGS. 4 and 5) and to open the first Pc port 15 in a state in which the second Pc port 16 is closed by the right axial end portion of the second cylindrical portion 90c of the differential CS valve body 90 (see FIG. 3).

Further, as illustrated in FIGS. 3 to 5, an annular groove 56 is formed in the outer periphery of the cylindrical portion 51b of the first hollow rod 51 by integrally connecting the first hollow rod 51 and the second hollow rod 54 to each other in a state in which the differential CS valve body 90 is externally fitted to the attachment portion 51c and the cylindrical portion 51b of the first hollow rod 51. The groove 56 is formed by the outer peripheral surface of the cylindrical portion 51b of the first hollow rod 51, a side surface 51g on the right side of the attachment portion 51c of the first hollow rod 51 in the axial direction, and a stopper portion 54e which corresponds to a movement regulation portion of the left axial end of the second hollow rod 54 and the axial position of the differential CS valve body 90 moving relative to the first hollow rod 51 in the axial direction is determined by the groove 56.

Specifically, the right axial end of the differential CS valve body 90, that is, the right axial end of the first cylindrical portion 90a is provided with an end surface portion 90e which is brought into contact with the stopper portion 54e of the left axial end surface of the second hollow rod 54 when the differential CS valve 57 is closed (see FIGS. 3 and 4), so that the axial position of the differential CS valve body 90 when closing the differential CS valve 57 is determined. Further, in the differential CS valve body 90, when the differential CS valve 57 is opened (see FIG. 5), the annular surface 90d is brought into contact with the side surface 51g on the right side of the attachment portion 51c of the first hollow rod 51 in the axial direction, so that the axial position of the differential CS valve body 90 when opening the differential CS valve 57 is determined.

Further, a difference between an axial dimension L56 of the groove 56 and an axial dimension L90a of the first cylindrical portion 90a of the differential CS valve body 90 is an axial separation dimension A corresponding to an axial dimension of a gap between the annular surface 90d of the differential CS valve body 90 and the side surface 51g on the right side of the attachment portion 51c of the first hollow rod 51 in the axial direction (i.e., L56−L90a=A, see FIGS. 3 and 4).

Accordingly, the end surface portion 90e of the right axial end of the differential CS valve body 90 is separated from the stopper portion 54e of the second hollow rod 54 in the axial direction by the separation dimension A in a state in which the annular surface 90d on the left side of the differential CS valve body 90 in the axial direction is brought into contact with the side surface 51g on the right side of the attachment portion 51c of the first hollow rod 51 in the axial direction (see FIG. 5). That is, the differential CS valve body 90 is further movable in the axial direction by the separation dimension A regardless of the opening and closing of the primary valve 50. Additionally, even when the differential CS valve body 90 moves to the left side in the axial direction by the separation dimension A in the non-energized state of the capacity control valve V, the overlapping between the right axial end portion of the first cylindrical portion 90a of the differential CS valve body 90 and the differential CS valve seat 11b when viewed from the radial direction is maintained, so that the differential CS valve 57 is not opened.

Next, the opening and closing mechanism of the differential CS valve 57 will be described. Since the pressure receiving area is substantially the same between the pressure acting on the left side in the axial direction corresponding to the valve opening direction of the differential CS valve 57 and the pressure acting on the right side in the axial direction corresponding to the valve closing direction, the pressure applied from the space 30A on the left side in the axial direction to the differential CS valve body 90 and the pressure applied from the space 30B and the third valve chamber 40 on the right side in the axial direction thereto are balanced in a state in which the control pressure Pc of the control chamber 4 and the suction pressure Ps of the suction chamber 3 are balanced, so that the differential CS valve body 90 moves to the right side in the axial direction by receiving the urging force of the coil spring 91 and the differential CS valve 57 is closed (see FIGS. 3 and 4).

On the other hand, when the primary valve 50 is closed and the control pressure Pc applied from the space 30A on the left side in the axial direction to the differential CS valve body 90 relatively becomes smaller than the control pressure Pc applied from the space 30B on the right side in the axial direction, that is, a differential pressure is generated in the axial direction in the energized state of the capacity control valve V, a force (indicated by a white arrow in FIG. 5) of moving the differential CS valve body 90 leftward in the axial direction is generated so that the differential CS valve body 90 moves leftward in the axial direction against the urging force of the coil spring 91 and the differential CS valve 57 is opened (see FIG. 5).

Next, the operation of the opening and closing mechanisms of the differential CS valve 57 and the spool DC valve 58 in accordance with the axial movement of the first hollow rod 51, the pressure-sensitive valve member 52, the second hollow rod 54, and the differential CS valve body 90 will be described.

First, the startup will be described. As illustrated in FIGS. 2 and 3, when the first hollow rod 51, the pressure-sensitive valve member 52, and the second hollow rod 54 are pressed rightward in the axial direction by the urging force of the pressure-sensitive body 61 in the non-energized state of the capacity control valve V, the right axial end 54a of the second hollow rod 54 sits on the sub-valve seat 82a of the fixed iron core 82 so that the sub-valve 55 is closed and the left axial end 51a of the first hollow rod 51 is separated from the primary valve seat 10a formed on the inner peripheral surface of the first valve housing 10 so that the primary valve 50 is opened. Further, after the variable displacement compressor M is left for a long time in a non-use state, the discharge pressure Pd, the control pressure Pc, and the suction pressure Ps are substantially balanced and the pressures applied from both sides in the axial direction to the differential CS valve body 90 are balanced. When the differential CS valve body 90 moves rightward in the axial direction by receiving the urging force of the coil spring 91, the right axial end portion of the first cylindrical portion 90a of the differential CS valve body 90 overlaps the differential CS valve seat 11b of the second valve housing 11 when viewed from the radial direction so that the communication between the control fluid having passed through the second Pc port 16 and the suction fluid having passed through the second Ps port 17 is closed by the differential CS valve 57. At this time, the spool DC valve 58 opens the first Pc port 15 and closes the second Pc port 16 so that the flow of the control fluid into the space 30B of the second valve chamber 30 through the second Pc port 16 is prevented.

Next, the variable displacement compressor M is started and the solenoid 80 of the capacity control valve V is energized so that the primary valve 50 is closed and the sub-valve 55 is opened (see FIG. 4). Further, the differential CS valve body 90 is maintained in the closed state since the end surface portion 90e of the right axial end is pressed by the stopper portion 54e of the second hollow rod 54 and the first hollow rod 51, the pressure-sensitive valve member 52, and the second hollow rod 54 are moved leftward in the axial direction together. Further, in the spool DC valve 58, the left axial end portion of the second cylindrical portion 90c of the differential CS valve body 90 closes the first Pc port 15 and slightly opens the second Pc port 16 so that the flow of the discharge fluid into the space 30A on the left side of the second valve chamber 30 in the axial direction through the primary valve 50 and the flow of the control fluid thereinto through the first Pc port 15 are prevented. At the same time, a blow-by gas flows into the control chamber 4 in accordance with the startup of the variable displacement compressor M and the control fluid pressurized from the balanced state flows through the second Pc port 16 so that the control pressure Pc in the space 30B on the right side of the second valve chamber 30 in the axial direction increases and the control pressure Pc in the space 30A on the left side of the second valve chamber 30 in the axial direction relatively decreases. At this time, since the control fluid in the space 30A on the left side of the second valve chamber 30 in the axial direction passes through the gap 92 and the gap between the end surface portion 90*e* of the differential CS valve body 90 and the stopper portion 54*e* of the second hollow rod 54 so as to escape from the third valve chamber 40 due to a pressure difference with the suction fluid in the third valve chamber 40, the control pressure Pc in the space 30A decreases.

Accordingly, the control pressure Pc applied from the space 30A on the left side in the axial direction to the differential CS valve body 90 becomes smaller than the control pressure Pc applied from the space 30B on the right side in the axial direction so that a differential pressure is generated in the axial direction, a force (indicated by a white arrow in FIG. 5) of moving the differential CS valve body 90 leftward in the axial direction is generated, the differential CS valve body 90 relatively moves leftward in the axial direction relative to the first hollow rod 51, the pressure-sensitive valve member 52, and the second hollow rod 54 against the urging force of the coil spring 91, the differential CS valve 57 is opened, and the second Pc port 16 is fully opened by the spool DC valve 58. As a result, a flow path (indicated by a solid arrow in FIG. 5) for discharging a fluid from the second Pc port 16 to the second Ps port 17 is formed and a liquefied fluid of the control chamber 4 is discharged in a short time. Thus, the startup responsiveness can be improved.

Further, when a differential pressure is not generated in a direction of moving the differential CS valve body 90 leftward in the axial direction during the normal control of the capacity control valve V, the differential CS valve 57 is closed, the flow rate of the flow path connecting the second Pc port 16 to the second Ps port 17 is reduced, and the control fluid having passed through the second Pc port 16 is prevented from flowing to the second Ps port 17. Accordingly, the controllability of the control pressure Pc of the control chamber 4 is excellent and the operation efficiency of the variable displacement compressor M can be improved (see FIGS. 3 and 4). In other words, the opening and closing of the primary valve 50 can be controlled while the differential CS valve 57 is closed.

Further, since it is possible to adjust the pressure in a balanced state between the space 30A defined on the left side of the second valve chamber 30 in the axial direction and the third valve chamber 40 by the gap 92 formed between the inner peripheral surface of the first cylindrical portion 90*a* of the differential CS valve body 90 and the outer peripheral surface of the cylindrical portion 51*b* of the first hollow rod 51, the capacity control valve V can have a simple structure.

Further, as illustrated in FIG. 4, since the left axial end of the differential CS valve body 90 constituting the spool DC valve 58, that is, the left axial end of the second cylindrical portion 90*c* is formed so as to be flush with the left axial end of the opening portion of the first Pc port 15 in the radial direction while the primary valve 50 is closed and the differential CS valve 57 is closed, the flow path for discharging a fluid from the Pd port 13 to the first Pc port 15 through the space 30A is reliably formed even when the primary valve 50 is slightly opened by the duty control of the capacity control valve V. Accordingly, the controllability of the control pressure Pc of the control chamber 4 is excellent and the operation efficiency of the variable displacement compressor M can be improved.

Further, since the primary valve 50 is closed when controlling the capacity control valve V with a maximum capacity, the differential CS valve 57 is moved by the differential pressure and the second Pc port 16 communicates with the second Ps port 17 through the space 30B, so that the control pressure Pc of the control chamber 4 can be maintained low.

Further, since the differential CS valve 57 is formed in a spool valve structure by the right axial end portion of the first cylindrical portion 90*a* of the differential CS valve body 90 and the differential CS valve seat lib formed on the inner peripheral surface of the second valve housing 11, the differential CS valve 57 is closed when the first hollow rod 51, the pressure-sensitive valve member 52, and the second hollow rod 54 are stroked by a predetermined amount or more in the axial direction. Accordingly, the differential CS valve 57 can be reliably closed. Further, since the differential CS valve 57 is maintained in the closed state even when the first hollow rod 51, the pressure-sensitive valve member 52, and the second hollow rod 54 are slightly moved in the axial direction due to disturbances such as vibration, for example, during normal control, the capacity control valve V is strong against disturbance and has excellent control accuracy.

Further, since the inner peripheral surface of the first cylindrical portion 90*a* slides on the outer peripheral surface of the cylindrical portion 51*b* of the first hollow rod 51 and the outer peripheral surface of the second cylindrical portion 90*c* slides on the spool DC valve seat 11*c* of the second valve housing 11 in the differential CS valve 57, the relative movement of the differential CS valve 57 with respect to the first hollow rod 51, the pressure-sensitive valve member 52, and the second hollow rod 54 in the axial direction can be stabilized.

Further, since the first Pc port 15 communicating with the space 30A on the left side of the second valve chamber 30 in the axial direction is provided adjacent to the second Pc port 16 communicating with the space 30B on the right side of the second valve chamber 30 in the axial direction and the first Pc port 15 and the second Pc port 16 is separated from each other by an axial dimension L10*d* of a partition wall 10*d* of the first valve housing 10 in the axial direction as illustrated in an enlarged part of FIG. 4, the formation range of the first Pc port 15 and the second Pc port 16, that is, an axial dimension B (i.e., B=L15+L10*d*+L16) from the left axial end of the first Pc port 15 to the right axial end of the second Pc port 16 is larger than an axial dimension L90*c* of the second cylindrical portion 90*c* of the differential CS valve body 90 (i.e., B>L90*c*). Further, the axial dimension L90*c* of the second cylindrical portion 90*c* of the differential CS valve body 90 is formed to be larger than the axial dimension of each of the first Pc port 15 and the second Pc port 16 (L90*c*>L15, L16).

Accordingly, as illustrated in FIGS. 3 to 5, since each of the first Pc port 15 and the second Pc port 16 can be opened by the second cylindrical portion 90*c* when the differential CS valve body 90 is moved in the axial direction and both the first Pc port 15 and the second Pc port 16 can be slightly opened when the second cylindrical portion 90*c* is moved to the substantial center of the formation range of the first Pc port 15 and the second Pc port 16 in the axial direction, the opening and closing of two ports of the first Pc port 15 and the second Pc port 16 can be controlled by one differential CS valve body 90 and hence the capacity control valve V can have a simple structure. Further, the partition wall 10d between the first Pc port 15 and the second Pc port 16 is not essential, but when the partition wall 10d is provided, one of the first Pc port 15 and the second Pc port 16 can be opened and the other of them can be closed in a reliable and simple manner.

Figure 6:
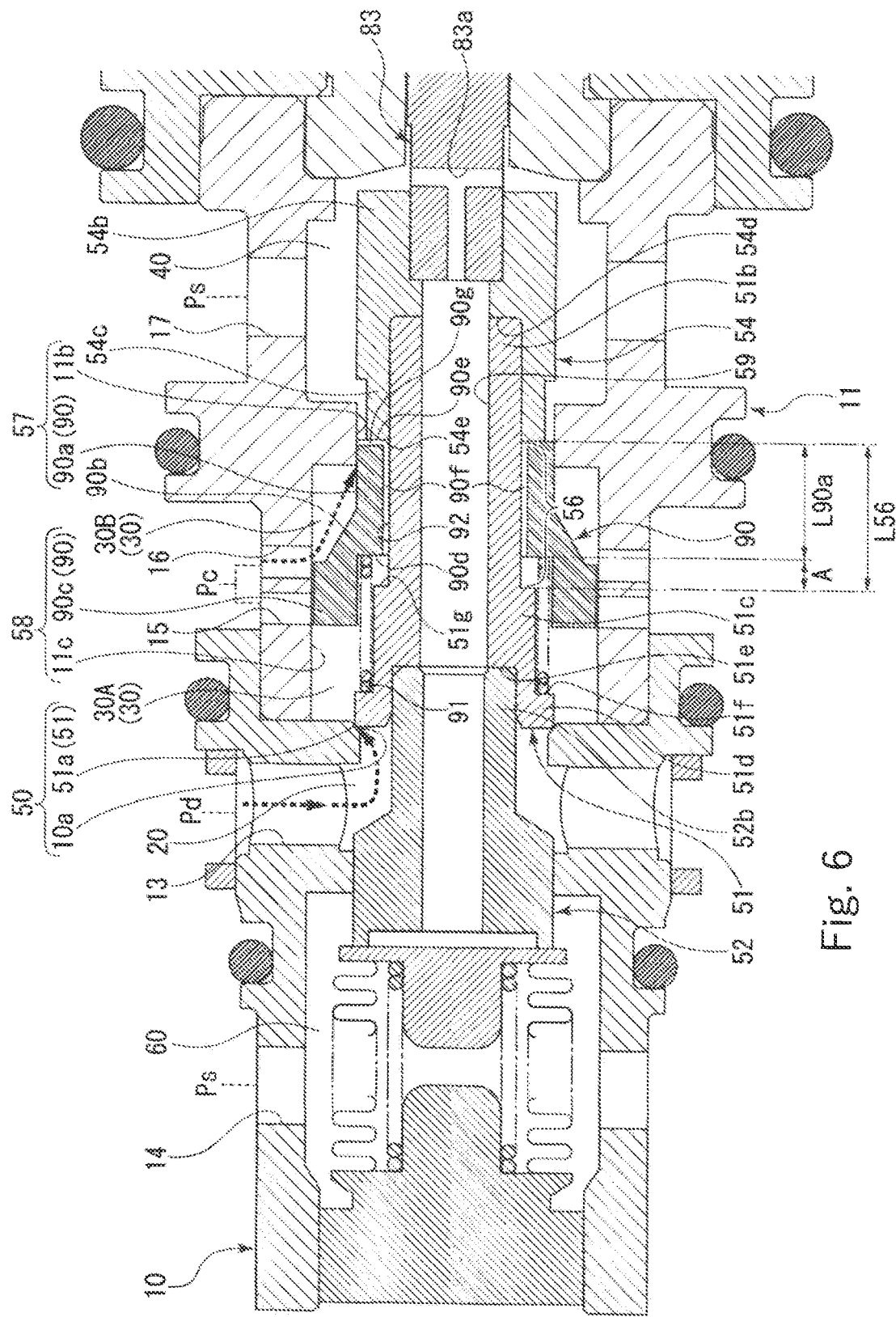
FIG. 6 is a cross-sectional view illustrating a case in which a primary valve is closed, a differential CS valve body moves so as to close a first Pc port and to open a second Pc port, and a differential CS valve is closed in an energized state (startup state) of a capacity control valve of a modified example of the embodiment.

Further, an example has been described in which a differential pressure is easily generated with respect to the space 30B on the right side of the second valve chamber 30 in the axial direction by discharging the control fluid in the space 30A on the left side of the second valve chamber 30 in the axial direction to the third valve chamber 40 through the gap 92 formed between the inner peripheral surface of the first cylindrical portion 90a of the differential CS valve body 90 and the outer peripheral surface of the cylindrical portion 51b of the first hollow rod 51 due to a pressure difference with the suction fluid in the third valve chamber 40 at the startup so that the control pressure Pc of the space 30A decreases. However, as illustrated in FIG. 6, the differential pressure may be increased by securing the large flow path cross-sectional area of the gap 92 in such a manner that the inner peripheral surface of the first cylindrical portion 90a of the differential CS valve body 90 is provided with a slit 90f corresponding to a groove extending in the axial direction and the right axial end of the first cylindrical portion 90a is provided with a slit 90g corresponding to a groove extending in the radial direction. Additionally, a slit may be provided in the outer peripheral surface of the cylindrical portion 51b of the first hollow rod 51 in order to increase the flow path cross-sectional area of the gap 92. In this way, since the gap 92 functions as a pilot passage for moving the differential CS valve body 90 and the differential CS valve 57 is opened, the effective flow passage area communicating the second Pc port 16 with the second Ps port 17 largely increases from the area of the gap 92.

Although the embodiments of the present invention have been described above with reference to the drawings, a detailed configuration is not limited to these embodiments and modifications or additions in the scope not departing from the spirit of the present invention are also included in the present invention.

For example, in the above-described embodiment, a structure that easily generates a differential pressure by discharging the control fluid in the space 30A on the left side in the axial direction of the second valve chamber 30 into the third valve chamber 40 through the gap 92 formed between the inner peripheral surface of the first cylindrical portion 90a of the differential CS valve body 90 and the outer peripheral surface of the cylindrical portion 51b of the first hollow rod 51 has been described. However, the invention is not limited thereto and the first cylindrical portion 90a of the differential CS valve body 90 may be provided with a through-hole extending in the axial direction. Further, a through-hole extending in the radial direction may be formed in the attachment portion 51c or the cylindrical portion 51b of the first hollow rod 51 so as to communicate the space 30A, the intermediate communication path 59 formed on the inside of the first hollow rod 51, and the space 30A defined on the left side in the axial direction of the second valve chamber 30 with one another.

Further, an example in which the first hollow rod 51 and the pressure-sensitive valve member 52 are separate members has been described, but both members may be integrated with each other.

Further, a fixed orifice and a communication path directly communicating the control chamber 4 of the variable displacement compressor M with the suction chamber 3 may not be provided.

Further, in the above-described embodiment, the sub-valve may not be provided and the right axial end of the second hollow rod does not need to have a sealing function when the right axial end functions as a support member that receives an axial load.

Further, the coil spring 91 is not limited to a compression spring, but may be a tension spring or may have a shape other than a coil shape.

Further, the first valve housing 10 and the second valve housing 11 may be integrated with each other.

Further, the pressure-sensitive body 61 may not use a coil spring therein.

REFERENCE SIGNS LIST

1 Casing
2 Discharge chamber
3 Suction chamber
4 Control chamber
10 First valve housing (valve housing)
10a Primary valve seat
10b Guide surface
10d Partition wall
11 Second valve housing (valve housing)
11b Differential CS valve seat
11c Spool DC valve seat
12 Partition adjustment member
13 Pd port (discharge port)
14 First Ps port (suction port)
15 First Pc port (control port, first control port)
16 Second Pc port (control port, second control port)
17 Second Ps port (suction port)
20 First valve chamber
30 Second valve chamber (control pressure chamber)
30A Space (discharge side control chamber)
30B Space (suction side control chamber)
40 Third valve chamber
50 Primary valve
51 First hollow rod (primary valve body, hollow rod)
51a Left axial end
51b Cylindrical portion
51c Attachment portion
51d Contact portion
51e Concave portion
51f Side surface
51g Side surface
52 Pressure-sensitive valve member (hollow rod)
52a Pressure-sensitive valve seat
53 Pressure-sensitive valve (pressure drive valve)
54 Second hollow rod (primary valve body, hollow rod)
54a Right axial end
54b First cylindrical portion
54c Second cylindrical portion
54d Concave portion
54e Stopper portion (movement regulation portion)
55 Sub-valve
56 Groove
57 Differential CS valve
58 Spool DC valve
59 Intermediate communication path (hollow communication path)
60 Pressure-sensitive chamber
61 Pressure-sensitive body 62 Bellows core
63 Coil spring
70 Cap
70a Seal surface
80 Solenoid
82 Fixed iron core
82a Sub-valve seat
83 Drive rod
90 Differential CS valve body
90a First cylindrical portion
90b Taper portion
90c Second cylindrical portion
90d Annular surface
90e End surface portion
90f, 90g Slit (groove)
91 Coil spring (spring)
92 Gap
Pc Control pressure
Pd Discharge pressure
Ps Suction pressure
V Capacity control valve

The invention claimed is:

1. A capacity control valve comprising:
a valve housing provided with a discharge port allowing a discharge fluid of a discharge pressure to pass therethrough, a suction port allowing a suction fluid of a suction pressure to pass therethrough, and a control port allowing a control fluid of a control pressure to pass therethrough; and
a primary valve which includes a primary valve seat and a primary valve body driven by a solenoid and controls a flow of a fluid between the discharge port and the control port by a movement of the primary valve body, the control port including a first control port and a second control port,
the capacity control valve further comprising a differential CS valve which includes a differential CS valve body disposed so as to be relatively movable in an axial direction with respect to the primary valve body and dividing a control pressure chamber into a discharge side control chamber and a suction side control chamber in the axial direction, the control pressure chamber communicating with the control port, the discharge side control chamber communicating with the first control port, the suction side control chamber communicating with the second control port, the differential CS valve body being operated by a differential pressure between the discharge side control chamber and the suction side control chamber so as to open the second control port and the sanction port, wherein
a spring configured to urge the differential CS valve body in a closing direction is disposed between the differential CS valve body and the primary valve body.

2. The capacity control valve according to claim 1, wherein the differential CS valve has a spool valve structure.

3. The capacity control valve according to claim 1, further comprising:
a pressure drive valve configured to be opened and closed in accordance with the suction pressure,
wherein the primary valve body includes a hollow rod provided with a hollow communication path capable of causing a pressure-sensitive chamber to communicate with the suction port when the pressure drive valve is opened.

4. The capacity control valve according claim 1,
wherein the primary valve body is provided with a movement regulation portion which regulates a movement of the differential CS valve body in the closing direction.

5. The capacity control valve according to claim 4,
wherein when the solenoid is in a non-energized state, the differential CS valve body is regulated by the movement regulation portion and the differential CS valve body closes a communication between the second control port and the suction side control chamber.

6. The capacity control valve according to claim 5,
wherein the differential CS valve has a spool valve structure.

7. The capacity control valve according to claim 5, further comprising:
a pressure drive valve configured to be opened and closed in accordance with the suction pressure,
wherein the primary valve body includes a hollow rod provided with a hollow communication path capable of causing a pressure-sensitive chamber to communicate with the suction port when the pressure drive valve is opened.

8. The capacity control valve according to claim 4,
wherein the different CS valve has a spool valve structure.

9. The capacity control valve according to claim 4, further comprising:
a pressure drive valve configured to be opened and closed in accordance with the suction pressure,
wherein the primary valve body includes a hollow rod provided with a hollow communication path capable of causing a pressure-sensitive chamber to communicate with the suction port when the pressure drive valve is opened.

10. The capacity control valve according to claim 1,
wherein a groove is formed in at least one of an outer periphery of the primary valve body and an inner periphery of the differential CS valve body.

11. The capacity control valve according to claim 10,
wherein the primary valve body is provided with a movement regulation portion which regulates a movement of the differential CS valve body in the closing direction.

12. The capacity control valve according to claim 11,
wherein when the solenoid is in a non-energized state, the differential CS valve body is regulated by the movement regulation portion and the differential CS valve body closes a communication between the second control part and the suction side control chamber.

13. The capacity control valve according to claim 10,
wherein the differential CS valve has a spool valve structure.

14. The capacity control valve according to claim 10, further comprising:
a pressure drive valve configured to be opened and closed in accordance with the suction pressure,
wherein the primary valve body includes a hollow rod provided with a hollow communication path capable of causing a pressure-sensitive chamber to communicate with the suction port when the pressure drive valve is opened.

* * * * *